US008043558B2

(12) United States Patent
Chambe et al.

(10) Patent No.: US 8,043,558 B2
(45) Date of Patent: Oct. 25, 2011

(54) APPARATUS FOR THE THERMAL TREATMENT OF ORGANICS MATERIALS AND METHOD THEREFOR

(76) Inventors: Maurice Chambe, St-Bruno de Montarville (CA); Eric Chambe, Lyons (FR); Pierre Chambe, Bessenay (FR); Anne-Sophie Delong, Westchester, PA (US)

( * ) Notice: Subject to any disclaimer, the term of this patent is extended or adjusted under 35 U.S.C. 154(b) by 487 days.

(21) Appl. No.: 12/097,626

(22) PCT Filed: Dec. 22, 2006

(86) PCT No.: PCT/CA2006/002128
§ 371 (c)(1),
(2), (4) Date: Aug. 22, 2008

(87) PCT Pub. No.: WO2007/076594
PCT Pub. Date: Jul. 12, 2007

(65) Prior Publication Data
US 2009/0060779 A1 Mar. 5, 2009

(30) Foreign Application Priority Data
Jan. 3, 2006 (CA) .................................. 2531873

(51) Int. Cl.
*A61L 2/04* (2006.01)
(52) U.S. Cl. ............ 422/28; 422/38; 422/307; 110/255; 432/72
(58) Field of Classification Search ............... 422/28, 422/38, 292; 432/72, 151; 110/242, 255
See application file for complete search history.

(56) References Cited

U.S. PATENT DOCUMENTS

| 4,191,527 | A | | 3/1980 | Trouillard |
| 4,230,451 | A | | 10/1980 | Chambe |
| 4,361,100 | A | | 11/1982 | Hinger |
| 4,441,880 | A | | 4/1984 | Pownall et al. |
| 4,616,572 | A | * | 10/1986 | Berthiller ..................... 110/254 |
| 5,062,372 | A | | 11/1991 | Ritter |
| 6,004,603 | A | * | 12/1999 | Vandepopuliere et al. ... 426/298 |
| 6,048,374 | A | | 4/2000 | Green |
| 6,189,463 | B1 | | 2/2001 | Ling et al. |
| 6,213,030 | B1 | | 4/2001 | Robertson et al. |
| 6,901,868 | B2 | | 6/2005 | Hornung et al. |
| 6,938,562 | B2 | | 9/2005 | Pope |

FOREIGN PATENT DOCUMENTS

| FR | 78 05465 | 2/1978 |
| JP | 07-136630 | 5/1995 |
| JP | 07-204611 | 8/1995 |
| JP | 09-133467 | 5/1997 |

* cited by examiner

*Primary Examiner* — Sean E Conley
(74) *Attorney, Agent, or Firm* — François Cartier; Robert Brouillette; Brouillette & Partners

(57) ABSTRACT

Organic materials being indirectly heated via hot air having the temperature required for their treatment, the process consists in the recycling of the vapours and gases evolving from the organic materials into a hot air circuit by forcing them into contact with the flame of a burner in order to burn the organic gases contained therein. The apparatus for executing the process comprises a double wall sealed tank; the outer wall being insulating and the inner wall being heat-conducting, the space, created by the walls, defines the hot air circuit.

15 Claims, 3 Drawing Sheets

APPARATUS FOR THE THERMAL TREATMENT OF ORGANICS MATERIALS AND METHOD THEREFOR

CROSS-REFERENCE TO RELATED APPLICATIONS

There are no cross-related applications.

FIELD OF THE INVENTION

The present invention generally concerns a process and an apparatus for the thermal treatment of organic materials and more particularly for the cooking, dehydration and/or sterilization of organic materials of all kind, for example, organic wastes such as bird droppings, manure, slaughterhouse wastes, incubator wastes, hide and carcass wastes, sewage treatment sludges, vaccines production wastes such as egg residues, biologically contaminated organic wastes and other similar materials, in order to transform them into a sterilized product valuable as soil fertilizer or even as animal food additives. The process and the apparatus are also adaptable for the dehydration of vegetables and vegetable matters.

BACKGROUND OF THE INVENTION

Numerous processes and systems have been provided for the thermal treatment of organic substances and, especially, for the thermal conversion of organic wastes into preferably useful products by a process involving dehydration, cooking and sterilization.

For example, sludges obtained from municipal sewage treatment are commonly dewatered and subjected to some type of sterilization treatment involving heating if the organic matter is to be used subsequently, e.g. in soil enrichment. The organic materials may thus be cooked and a variety of plants have been provided for this purpose.

Similar systems are used for the thermal treatments of other organic wastes and materials.

However, one of the disadvantages of conventional systems is the evolution of vapours and gases which carry with them odorific components and frequently even toxic substances and which are generally directly discharged into the atmosphere. The conventional systems also have the disadvantage that they are generally complex, require much manpower and are thermally uneconomical.

Moreover, these systems are generally not adapted to neutralize and/or sterilize organic materials which are contaminated with bacteria and/or virus (i.e. egg residues from vaccines production) and/or other pathogens.

There is thus a need for an apparatus which obviates the aforementioned problems.

OBJECTS OF THE INVENTION

It is the principal object of the present invention to provide an improved system for thermally treating organic wastes whereby the disadvantages of earlier systems can be avoided.

Another object of the invention is to provide an improved apparatus for the thermal treatment of organic materials.

Still another object of the present invention is to provide an apparatus for thermally treating biologically contaminated organic materials.

Yet another object of the invention is to provide an apparatus for thermally treating organic substances, especially organic wastes, which effects substantially total destruction of any odours, reduces the manpower requirement and is more economical than earlier systems from an energy viewpoint.

To that end, the process of the invention, which is of the type of having organic materials being indirectly heated via hot air having the temperature required for their treatment, consists in the recycling of the vapours and gases evolving from the organic materials into a hot air circuit by forcing them into contact with the flame of a burner in order to burn the organic gases contained therein.

Therefore, not only are the odours destroyed, but the recycling of the evolved vapours and gases allows for a notable reduction in calorie consumption.

SUMMARY OF THE INVENTION

These objects and others which will become apparent hereinafter are attained, in accordance with the present invention, in a process for the thermal treatment of organic materials, especially organic wastes, which can involve the dehydration, sterilization and cooking of the organic materials to yield useful solids, the process encompasses agitating the mass of the organic wastes in a sealed chamber in contact with a thermally conducting wall which is externally heated by combustion gases generated by a burner into which vapours released in the sealed by the organic materials in the chamber are fed for combustion to the burner flame.

By the continuous recycling of all evolved gases and vapours from the solid material to the burner flame, e.g. by mixing these vapours and gases with the combustion-sustaining gas (air) and the fuel, total destruction of these vapours may be effected. Moreover, the recycled gas and vapours contribute calorific value to the combustion process and therefore improve the fuel economy of the apparatus. Finally, because of the destruction of the odour-carrying gases or vapours by combustion, the gases, discharged into the environment, are substantially free from odorific, noxious, biologically contaminated and/or toxic substances.

The apparatus of the present invention preferably comprises a horizontally elongated double wall tank formed with a semicylindrical bottom and provided internally with mixing or agitating means for moving the organic materials against the inner wall which delimits the chamber.

According to an aspect of the invention, the space between the inner wall and outer wall is supplied with the combustion gases from a burner which can open preferably into the space below the bottom of the chamber. The inner wall is made of material having a high thermal conductivity while the outer wall is made of thermally insulating material.

According to a feature of the invention, the tank is provided with at least one and preferably a plurality of sealable openings communicating with the chamber for introducing the organic wastes, preferably in the roof of the tank, while a further sealable opening forms a discharge orifice at the bottom thereof and, advantageously, at one axial end.

The apparatus is also provided with a duct communicating with the chamber, preferably through the roof, and opening into the burner chamber.

The agitating or mixing means within the chamber may comprise a mixer having a horizontal shaft coinciding with or running parallel to the axis of the tank and rotatable in one direction to simply displace the organic material along the thermally conductive wall while rotation in the opposite direction causes its vanes, which can be appropriately shaped, to act as conveyor members and advance the organic material toward the discharge orifice. However, should the shape of the tank be different, the configuration of the agitating means would change accordingly.

Naturally, sensor means can be provided within the chamber, the chimney and/or other appropriate locations to ensure the development and maintenance of the desired temperature therein.

While the burner can be operated to provide a suction which induces recirculation of the evolved vapours and gases, it has been found to be advantageous to provide a blower or the like in the duct linking the chamber to the burner for the force-feeding of the released vapours and gases thereto.

The configuration of the burner, according to the best mode currently known for carrying out the invention in practice, includes a frustoconically converging outlet which, at its mouth, is provided with a heated refractory body of inwardly converging frustoconical configuration which constricts this mouth or orifice. This body, which is heated to incandescence, serves to ensure that no organic substances can traverse the orifice without undergoing combustion or pyrolysis.

Also, according to a preferred embodiment, the space between the two walls through which the combustion gases circulate to heat the content of the chamber is preferably provided with a network of baffles to ensure effective distribution of the hot gases along the wall and optimum transfer of heat therethrough.

Finally, an important feature of the present invention is the presence of a heat exchanger located near the roof of the tank. Combustion gases which have circulated through the space between the inner and outer walls are further carried to the heat exchanger. Fresh air, used in the dehydration and in the combustion of the fuel and the evolved gases and vapours, is also sent to the heat exchanger. Residual heat from the combustion gases is then partially transferred to the fresh air. The heated fresh air is then introduced into the tank and therefore increases the efficiency of the dehydration process.

DETAILED DESCRIPTION OF THE PREFERRED EMBODIMENT

Figure 1:
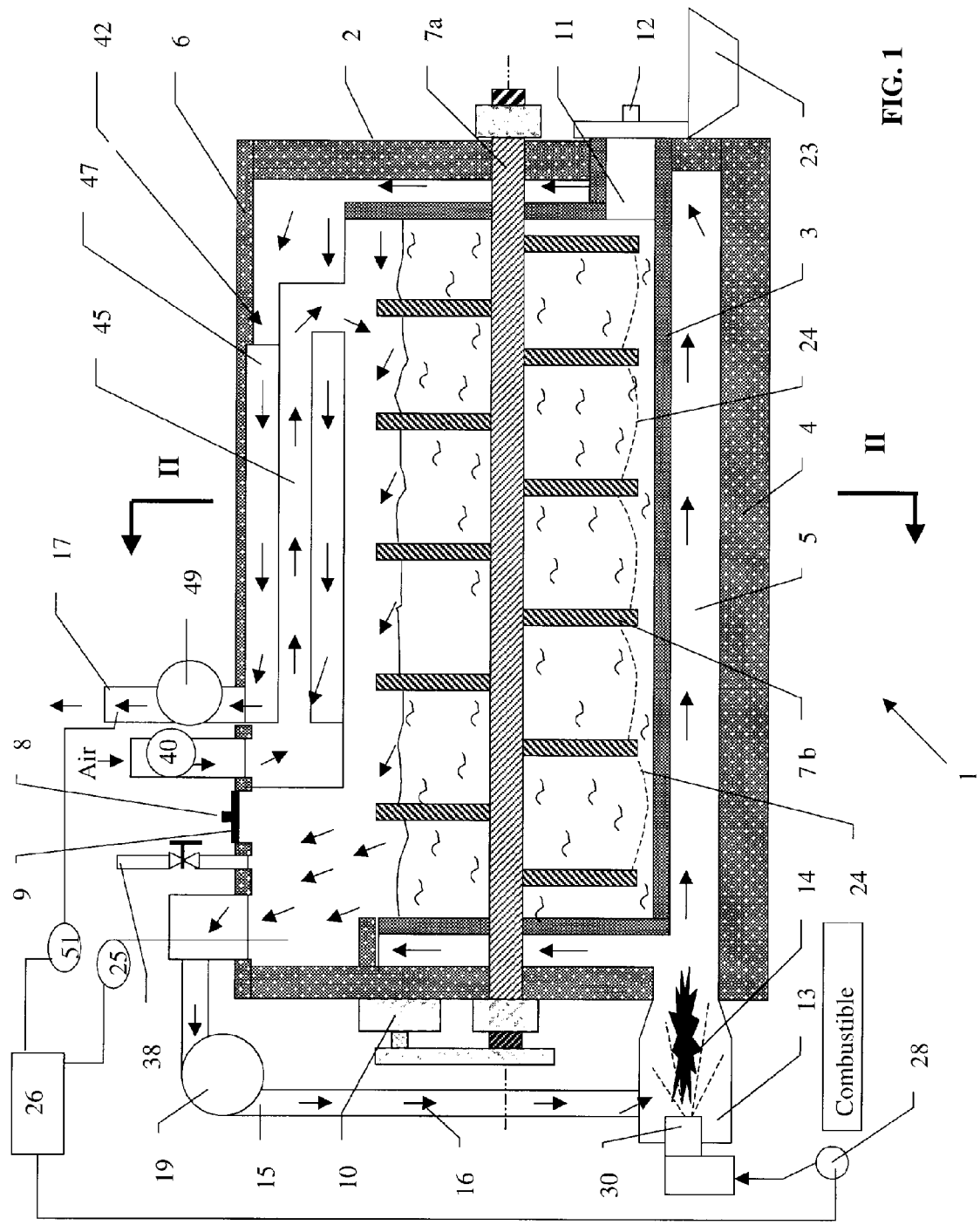
FIG. 1 is a longitudinal vertical cross-sectional view through an apparatus for the heating of organic matter in accordance with the present invention, the view being taken substantially along the line I-I of FIG. 2.

As can be seen from the drawings, the apparatus 1 of the present invention is constituted as a horizontally elongated structure 2 which is formed with a semi-cylindrical bottom and a pair of vertical longitudinal walls rising from this semi-cylindrical bottom and closed at its axial ends. The trough-shaped tank 2 is also closed at its top by a horizontal wall 6. Thus the tank generally has a horseshoe cross-section when taken transversely with respect to the horizontal axis of the tank.

The tank 2 is a double wall structure, i.e. comprises an inner wall 3 of a material which is a good heat conductor, e.g. a metal or metal alloy of copper, steel, stainless steel or aluminium, while the exterior wall 4 is composed of a thermally insulating material, e.g. a refractory, ceramic or the like.

A space 5 is provided between the two walls 3 and 4 along the bottom and longitudinal end sides of the tank 2 and constitutes a space or duct 5 for circulating the heated air which is used to dehydrate and eventually cook the organic material received in the tank 2.

The roof 6 of the tank 2 is a wall which seals this space and is also constituted of a thermally insulating material.

A mixer is provided within the tank 2 and has been shown at 7. This mixer 7 has a shaft 7a which runs parallel to or coincides with the axis of the bottom of the tank 2 and which is generally mounted to the end walls of the tank 2. At one of the end walls, the shaft 7a is driven by a gear or belt drive via an electric motor and speed-reducing gearbox as represented at 10. A hydraulic torque limiter (not shown) can also be mounted to the shaft 7a in order to prevent any excessive strain to the shaft 7a. The other end of the shaft 7a is provided with a journal bearing on the opposite end wall of the tank 2. The shaft carries a plurality of radial arms 7b which are axially spaced apart along the shaft 7a and which serve to rotate the mass along the wall 3 and mix the mass during the heating operation.

A first filling opening 8 is provided in the roof 6 and is closed sealingly by a removable cover 9. The first filling opening 8 is generally used for solid or semi-solid waste materials. For liquid or at least pumpable waste materials, a second filling opening 38 in the form of a valve 38 is provided in the roof 6. The valve 38 also allows for the direct filling of the tank 2 without any direct contact of the waste materials with the exterior of the tank 2. This is particularly important when the waste materials are contaminated with bacteria and/or virus. Should the waste materials be in contact with the exterior of the tank 2, mist or dust from the waste materials could be dispersed in the area surrounding the apparatus 1, effectively contaminating the area.

The second filling opening 38 can also be used to fill the tank 2 with water when the apparatus 1 is in pre-heating mode. The pre-heating mode shall be described further below.

The tank 2 is also provided with a discharge orifice 11. The discharge orifice communicates with a chute 23. The discharge orifice 11 can be sealingly closed by a removable plug 12.

The apparatus 1 is also provided with a burner 14 which has a combustion chamber 13 which opens through its forwardly converging mouth into the circulating chamber or space 5 below the bottom of the space delimited by the walls 3 and 4. The burner 14 is supplied with fuel, which can be natural or synthetic gas, fuel oil, or some other combustible, by a suitable nozzle, atomizing sprayer or injector. The burning process is represented by broken lines within the chamber 13. The result of the combustion is a mixture of combustion gases and these gases circulate through the space 5 defined by the walls 3 and 4, heating the organic material via the thermally conductive wall 3 in the process. These hot gases heat, dehydrate and eventually cook the organic materials introduced into the tank 2 through openings 8 or 38 in order to generate evolving gases and vapours as the material is being mixed by the mixer 7.

The interior of the tank 2 is connected to the combustion chamber 13 of the burner 14 by a duct 15 which carries the gases and vapours evolving from the organic materials to the burner 14.

Since a subatmospheric pressure may be generated in the burner chamber 13 slightly upstream of the expanding gases resulting from combustion, e.g. by the venturi effect, this suction may be sufficient to draw the gases and vapours released from the organic materials under treatment, as represented by the arrows 16, through the duct 15 and into the burner 14. The gases and vapours released from the organic material are thus fed to the flame of the burner 14 and are burned to generate at least a substantial portion of the calories required for operating the heating apparatus 1. However, a blower 19 may also be provided in the duct 15, preferably near the roof 6 of the tank 2, in order to improve the circulation of the evolved gases and vapours from the tank 2 to the burner 14.

This system has therefore the two-fold advantage that the vapours or gases evolved from the organic material and which carry the odours are virtually completely destroyed by combustion and, in addition, the gases are fed to the burner 14 at their vaporization temperatures which permits a significant recuperation of calories.

Figure 2:
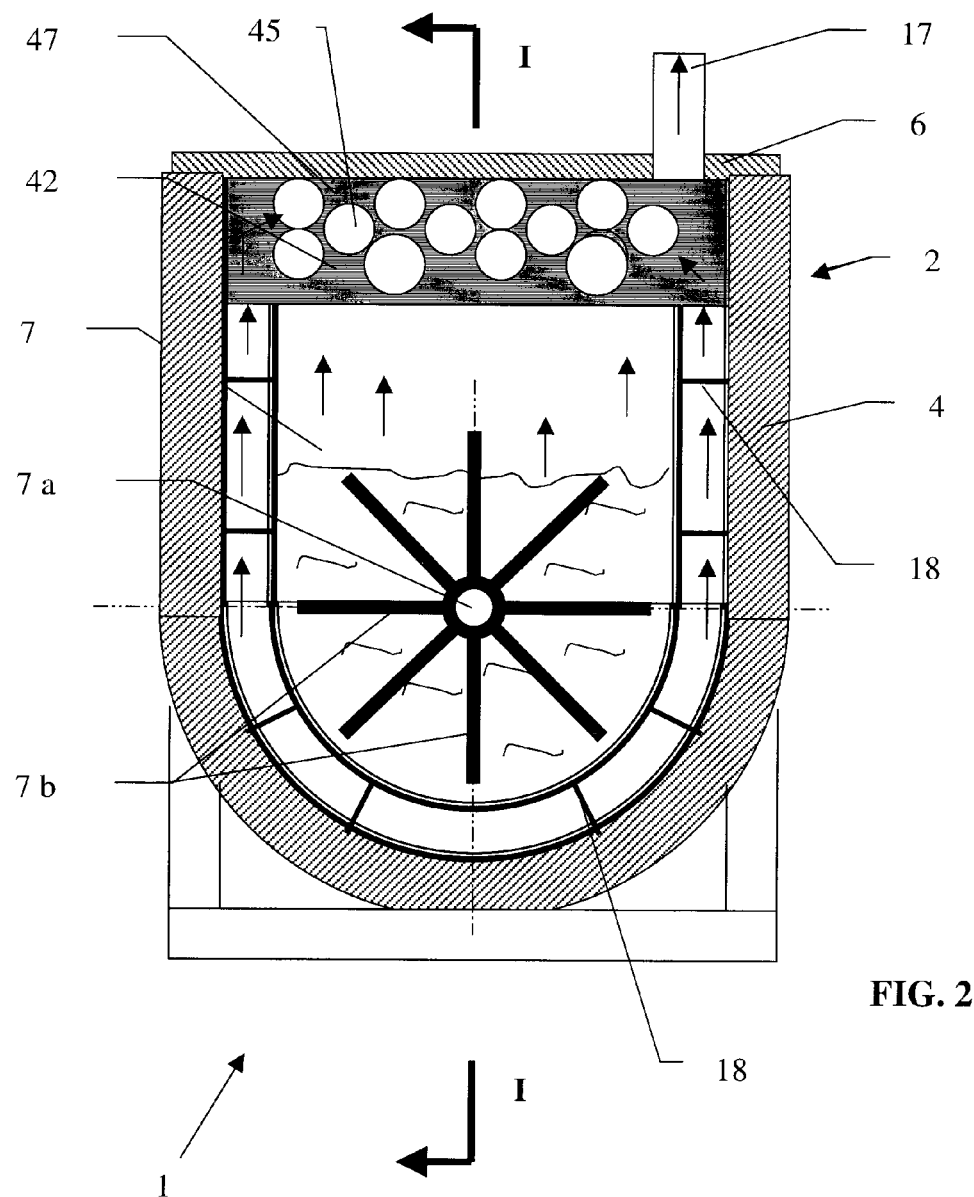
FIG. 2 is a transverse cross-section view through the apparatus of FIG. 1 taken along the line II-II thereof.

A better distribution of the heat along the interior wall 3 of the tank 2 is obtained by providing baffles 18 at staggered locations. The baffles 18 have only been shown diagrammatically in FIG. 2. These baffles 18 reduce the flow of the combustion gases in the space 5, therefore allowing a better transfer of the heat between the gases and the organic materials.

In order to enhance the dehydration process, fresh air is taken from the exterior of the tank 2 by a pump 40 and is introduced into the tank 2. However, in order to have a more efficient and preferably faster dehydration process, the fresh air is preferably sent to a heat exchanger 42 located near the roof 6 of the tank 2 before being sent inside the tank 2. Hotter fresh air has a greater capacity to absorb vapours and others gases evolving from the organic materials. Furthermore, heated air helps heating the organic materials and thus accelerates their dehydration.

The heat from the heat exchanger 42 comes from the combustion gases. Indeed, the heat exchanger 42 is used to transfer a portion of the heat remaining in the combustion gases, which have been circulating in the space 5 between the walls 3 and 4, to the fresh air.

Thus, as fresh air is pumped from the exterior, it is sent to a coil of pipes 45 adjacent to another coil of pipes 47 through which circulate the combustion gases. These coils of pipes 45 and 47 are preferably made of heat conducting materials such as copper. As fresh air circulates in pipes 45 and combustion gases circulate in pipes 47, a portion of the heat is transferred from the combustion gases to the fresh air. At the end of the pipes 45, the heated fresh air is sent inside the tank 2 in order to mix with the evolved gases and vapours and thus to accelerate the dehydration process. This fresh air is also used in the combustion chamber 13 to burn the fuel and the evolved vapours and gases.

Moreover, since the coil of pipes 47 is located inside the tank 2, it will also transfer a portion of the heat of the combustion gases to the ambient air already inside the tank 2, further accelerating the dehydration process.

Thus, the present apparatus 1 has the direct advantage of being extremely energy efficient. By recycling as much heat as possible from the combustion gases, it is possible to hasten the dehydration process or reduce the fuel consumption.

Finally, the end of the coil of pipes 47 is connected to a chimney 17 through which the gases are expelled into the atmosphere.

A blower 49 may be mounted inside the chimney 17 is order to regulate the flow of gases in the space 5 located between walls 3 and 4 and prevent any overpressure that might damage the equipments or hinder the dehydration process.

In order to eliminate any risk of noncombustion of the recycled vapours in the combustion chamber 13 of burner 14, a refractory body 21 is disposed at the center of the mouth of chamber 13 (see FIG. 3), i.e. immediately ahead of the combustion flame. This body is thus continuously maintained at incandescence by the flame. In addition, the mouth of the burner is formed as a frustocone converging toward the orifice, thereby forcing all of the gases toward and along the refractory body 21. The contact of these gases with the refractory body guarantees an almost total combustion or thermal degradation of the potentially unburned gases.

Furthermore, the frustoconical mouth of the chamber 13 also has been found to create a counter pressure which promotes a better mixing of the recycled vapours with the burner 14 flame.

Figure 3:
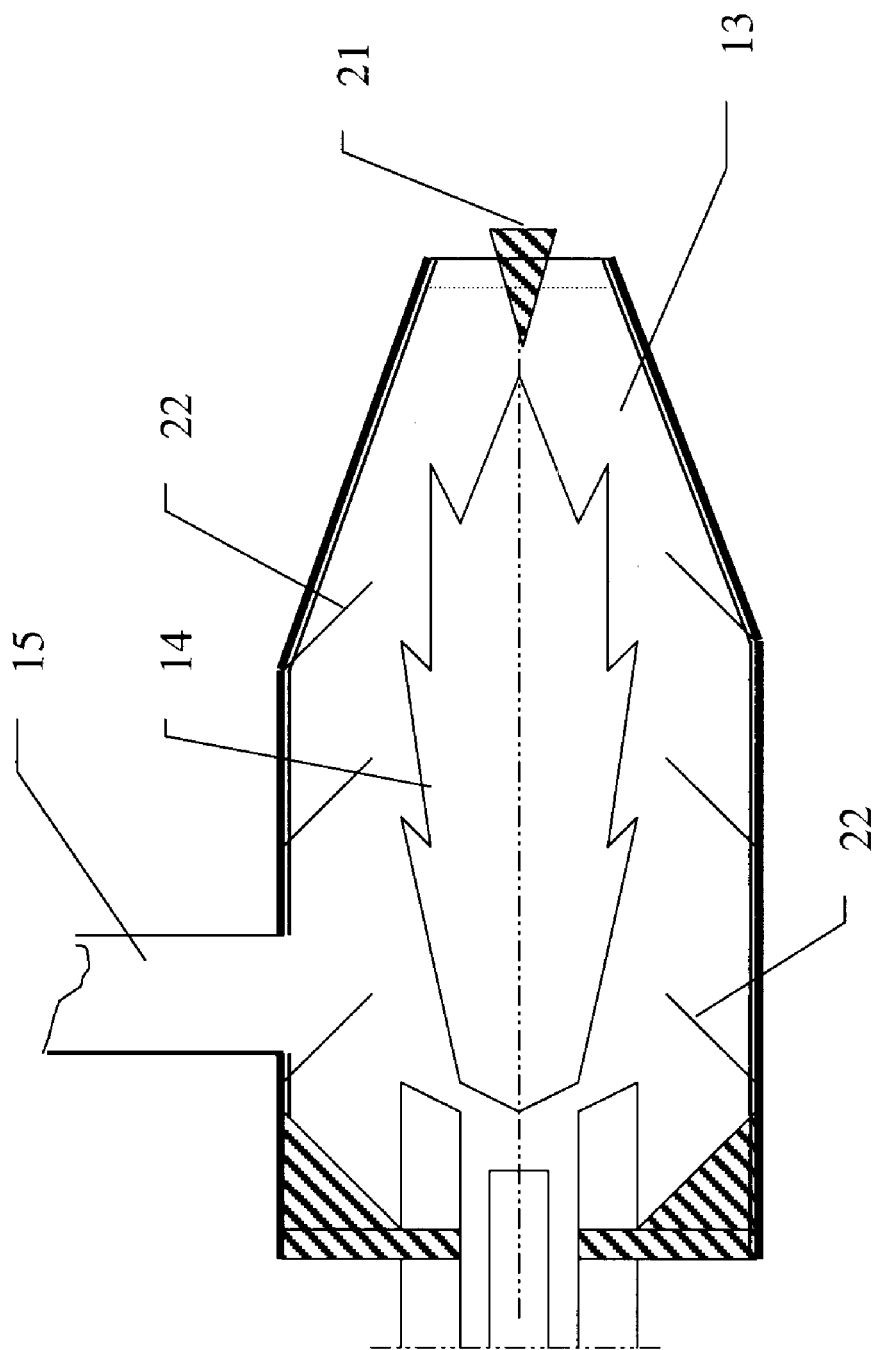
FIG. 3 is a cross-sectional view drawn to an enlarged scale showing a detail of the burner of the apparatus of FIG. 1.

As is also shown in FIG. 3, the combustion chamber 13 of the burner 14 can be provided with deflectors 22 which are effective to prevent any back flow of the combustion gases, notably through the passage 15.

Notwithstanding the refractory body 21, it is still possible that some organic materials, particularly virus and other pathogen, might escape total destruction in the combustion chamber 13. In order to prevent virus and other pathogens from escaping into the atmosphere, the apparatus 1 comprises a pre-heating mode. In the pre-heating mode, clean water or other neutral and generally non-toxic liquid is introduced inside the tank 2 and the apparatus 1 is started. When it is detected that the apparatus 1 and more particularly, the interior of the tank 2 and the chimney 17 have reached a predetermined temperature (i.e. a preferably biocidal temperature), organic wastes are introduced inside tank 2. The heat of the tank 2 and of the chimney 17 guarantees that no virus and other pathogens will exit the apparatus 1 without being destroyed. The temperature is preferably detected via temperature sensors 25 and 51 located respectively inside the tank 2 and the chimney 17.

Should biologically contaminated wastes be introduced in the apparatus 1 when it is cold, some virus and other pathogens might escape total destruction since the heat of the apparatus 1 would be insufficient to provide biocidal properties. These virus and other pathogens would thus be ejected in the atmosphere, effectively contaminating the area surrounding the apparatus 1.

According to yet another feature of the invention, each vane or blade 7b of the mixer 7 is formed with a lateral ramp, not visible in the drawing, oriented toward the discharge orifice 11 so as to deflect the organic materials toward the orifice 11 when the mixer 7 rotates in a first direction. However, the vanes 7b provide no axial force when the mixer 7 rotates in the opposite direction. Upon their exit via the orifice 11, the organic materials are received into a chute or hopper 23.

As shown in FIG. 1, the free ends of the mixer vanes 7b may be provided with flexible elements such as chains 24 to scrape and therefore limit the adhesion of the organic materials to the interior wall 3 of the tank 2.

Finally, the apparatus 1 shown in FIG. 1 is preferably provided with at least two temperature sensors 25 and 51 which are connected to a controller 26. The controller 26, via the fuel valve 28 of the burner nozzle 30, can maintain the desired temperature in the treatment chamber 2 and/or in the chimney 17. If required, other sensors (i.e. temperature, pressure, humidity) and detectors (notably of chemical products and of pathogens) can also be installed on the apparatus 1.

Obviously, the above-recited characteristics of the preferred embodiment must not be considered as limitative in nature. Indeed, the shape of the tank, the configuration of the mixer and the placement of certain elements can vary. Hence, the effective scope of the invention shall be recited in the appended claims.

The invention claimed is:

1. An apparatus for the thermal treatment of organic materials, said apparatus comprising:
   a. a tank having a bottom portion and comprising a inner wall made of heat conductive material and an outer wall made of insulating material, said inner wall and said outer wall defining a passage;
   b. a roof closing said tank and forming, with said inner wall, a treatment chamber adapted to receive organic materials;
   c. at least one access opening in communication with said chamber through which said organic materials can be introduced into said chamber;
   d. a burner opening into said passage and configured for sustaining a flame adapted to generate combustion gases, said combustion gases circulating through said passage for heating said organic material via said inner wall;
   e. a first conduit extending between said chamber and said burner for carrying gases evolving from said organic materials to said flame;
   f. a second conduit extending between said chamber and the exterior of said apparatus for introducing fresh air into said chamber;
   g. a mixer located inside said chamber;
   h. a heat exchanger connected to said passage and to said second conduit for transferring a portion of the heat of said combustion gases to said fresh air and to the ambient air inside said chamber, said heat exchanger being located inside said chamber.

2. An apparatus as claimed in claim 1, further comprising at least one temperature sensor.

3. An apparatus as claimed in claim 1, wherein said tank further comprises a discharge opening adapted to be hermetically closed.

4. An apparatus as claimed in claim 1, wherein said heat exchanger further comprises a third and a fourth conduits, said third conduit being connected to said passage for carrying said combustion gases and said fourth conduit being connected to said second conduit for carrying said fresh air, said third and fourth conduits being adjacent for transferring said portion of said heat of said combustion gases to said fresh air.

5. An apparatus as claimed in claim 4, wherein said third conduit is further connected to a chimney for carrying said combustion gases outside said apparatus and wherein said fourth conduit is further connected to said chamber for carrying said heated fresh air inside said chamber.

6. A process for the thermal treatment of biologically contaminated organic materials, said process comprising the steps of:
   a. providing an apparatus adapted for the thermal treatment of organic materials, said apparatus comprising at least a tank, a burner and a temperature sensor;
   b. introducing a liquid inside said tank;
   c. preheating said apparatus with said burner;
   d. waiting until the inside of said tank reaches a biocidal temperature;
   e. introducing biologically contaminated organic materials inside said tank;
   f. thermally treating said biologically contaminated organic materials located inside said tank with said burner;
   g. recuperating gases and vapours evolving from said biologically contaminated organic materials under treatment;
   h. carrying said gases and said vapours to said burner for burning said gases and said vapours.

7. A process as claimed in claim 6, wherein said liquid is a substantially neutral liquid.

8. A process as claimed in claim 7, wherein said substantially neutral liquid is water.

9. A process as claimed in claim 6, wherein said biologically contaminated organic materials are waste deriving from vaccines production.

10. A process as claimed in claim 6, wherein said tank comprises an inner wall made of heat conductive material and an outer wall made of insulating material, said inner wall and said outer wall defining a passage, and wherein said burner opens into said passage and is configured for sustaining a flame adapted to generate combustion gases, said combustion gases circulating through said passage for heating said biologically contaminated organic materials via said inner wall.

11. A process as claimed in claim 10, wherein said apparatus comprises a conduit extending between said tank and said burner for carrying said gases and said vapours evolving from said biologically contaminated organic materials to said burner.

12. A process for the thermal treatment of biologically contaminated organic materials in an apparatus as claimed in claim 1, said process comprising the steps of:
   a. introducing a liquid inside said treatment chamber;
   b. preheating said treatment chamber with said burner;
   c. waiting until the inside of said treatment chamber reaches a biocidal temperature;
   d. introducing biologically contaminated organic materials inside said treatment chamber;
   e. thermally treating said biologically contaminated organic materials located inside said treatment chamber with said burner;
   f. recuperating said gases evolving from said biologically contaminated organic materials under treatment;
   g. carrying said evolving gases to said burner for burning said evolving gases.

13. A process as claimed in claim 12, wherein said liquid is a substantially neutral liquid.

14. A process as claimed in claim 13, wherein said substantially neutral liquid is water.

15. A process as claimed in claim 12, wherein said biologically contaminated organic materials are waste deriving from vaccines production.

* * * * *